United States Patent

Smith et al.

[15] 3,668,463

[45] June 6, 1972

[54] RASTER CORRECTION CIRCUIT UTILIZING VERTICAL DEFLECTION SIGNALS AND HIGH VOLTAGE REPRESENTATIVE SIGNALS TO MODULATE THE VOLTAGE REGULATOR CIRCUIT

[72] Inventors: Lawrence Edward Smith; Robert Joseph Gries, both of Indianapolis, Ind.

[73] Assignee: RCA Corporation

[22] Filed: May 15, 1970

[21] Appl. No.: 37,781

[52] U.S. Cl. ....................315/27 GD
[51] Int. Cl. ....................H01j 29/70
[58] Field of Search ....................315/27 R, 27 TD, 27 GD

[56] References Cited

UNITED STATES PATENTS

| | | | |
|---|---|---|---|
| 3,237,048 | 2/1966 | Slavik | 315/27 GD |
| 3,571,653 | 3/1971 | Hansen et al. | 315/27 GD |

*Primary Examiner*—Carl D. Quarforth
*Assistant Examiner*—J. M. Potenza
*Attorney*—Eugene M. Whitacre

[57] ABSTRACT

A raster correction circuit for a television receiver combines vertical deflection rate signals and high voltage representative signals and couples them to a control transistor which varies the bias on a regulator transistor to vary the energy supplied to the deflection circuit during each raster field in a manner to correct for side pincushion distortion.

11 Claims, 5 Drawing Figures

INVENTORS
Lawrence E. Smith
& Robert J. Gries
BY Harold W. Rieck
ATTORNEY

INVENTORS
Lawrence E. Smith
& Robert J. Gries
BY Harold W. Reick
ATTORNEY

RASTER CORRECTION CIRCUIT UTILIZING VERTICAL DEFLECTION SIGNALS AND HIGH VOLTAGE REPRESENTATIVE SIGNALS TO MODULATE THE VOLTAGE REGULATOR CIRCUIT

The present invention relates to a raster correction circuit and particularly a circuit utilized to correct for side pincushion distortion in a color television receiver.

In modern television receivers particularly of the type employing wide angle deflection systems (such as 110°), pincushion distortion becomes an increasing problem, since the deflection angle is even greater than the conventional 90° systems. Saturable reactors which have been utilized in the 90° systems to produce side pincushion correction are less suitable in the wide angle receivers, since the saturable reactor must be larger and therefore more costly. In compactly designed receivers, available space for components is minimal and must be efficiently utilized. The addition of a relatively large pincushion reactor is therefore undesirable. One of the features of the circuit embodying the present invention is that the costly and somewhat bulky side pincushion transformer has been eliminated.

In the present circuit, a side pincushion correction signal which is a recurring parabolic waveform at the vertical deflection rate is applied to the voltage regulator circuit of the type described in a co-pending application entitled "Voltage Regulator", Ser. No. 731,163 which was filed on May 26, 1968, now U.S. Pat. No. 3,517,253. Since the deflection energy for the 110° deflection system has increased from approximately 3.5 milli-joules required in its 90° counterpart to 5.4 milli-joules and since the high voltage power requirements have remained approximately the same for both deflection systems (the high voltage power is decreased in the smaller screen receivers), it has been discovered that adding a pincushion waveform which varies the total input energy to the horizontal deflection system in a parabolic fashion produces an undesirable secondary variation in the raster shape. This results from the fact that although as the input energy is varied by the voltage regulator in response to the parabolic pincushion correction information, both the deflection current and the high voltage tend to change; they vary, however, in a disproportionate amount which produces a secondary raster distortion. This effect is particularly noticeable in a wide angle deflection system where a relatively large pincushion correction waveform is necessary to correct for side pincushion.

It is necessary therefore to apply an additional correction signal which is representative of the high voltage variations caused by the application of the parabolic pincushion correction waveform to the voltage regulator circuit.

Circuits embodying the present invention include a horizontal deflection system employing a non-dissipative high voltage regulator of the type that varies the input energy to the horizontal deflection system and includes a control transistor coupled to the regulator circuit which receives both a vertical rate signal from the vertical deflection circuit, and a signal representative of the high voltage for producing side pincushion correction for the television raster.

The invention can best be understood by referring to the figures and the accompanying descriptions in which:

FIG. 1 pictorially illustrates a raster displaying side pincushion distortion;

FIG. 2 is the resulting raster shape when only the vertical rate signal modulates the input energy to the horizontal deflection system;

FIG. 3 divided into portions 3A and 3B shows partially in block and schematic diagram form a preferred embodiment of the present invention which corrects the raster distortion shown in FIGS. 1 and 2 as well as maintains scan width constant for varying beam currents; and FIG. 4 illustrates in schematic diagram form, a preferred circuit used to develop the additional correction signal.

Referring to FIG. 1 in detail, there is shown the top and bottom horizontal lines of a raster which are of normal shape. The vertical lines illustrate a parabolic distortion commonly referred to as side pincushion distortion which is caused by the geometry of the television picture tube whereby the center of curvature of the face of the tube and the electron beam deflection center do not coincide. The distortion becomes particularly acute in the 110° deflection system where the electron beam deflection center is moved further from the center of curvature of the kinescope faceplate.

Assuming high voltage is held constant, it is seen that to compensate for this distortion, it is necessary to increase the horizontal yoke current to a maximum at the center of raster starting from the top and in turn decrease the magnitude of the horizontal yoke current from the center of the raster to the bottom of the raster. This will have the effect of changing the raster width to produce the desired rectangular raster configuration.

It is known to apply a vertical rate parabolic waveform to a series voltage regulator which varies the applied voltage to the horizontal deflection system to provide side pincushion correction. If a vertical rate parabolic waveform is applied to the voltage regulator of the type described in the co-pending application cited above and which is utilized in a 110° deflection system, the high voltage as well as the horizontal yoke current will vary in response to the parabolic waveform. And as the input energy is changed due to the addition of the parabolic information, the deflection current and the high voltage change a disproportionate amount partially due to the high voltage system's response characteristics.

As illustrated in FIG. 2, the changes in both deflection current and high voltage caused by the parabolic pincushion correction information produces a secondary raster distortion. This distortion is manifested by elongated S-shaped raster edges as shown by the raster sides in FIG. 2. The high voltage change due to the addition of pincushion information is utilized to accelerate the electron beam and will lag somewhat the change in deflection current caused by the pincushion information. This lag results from the capacitive load, the kinescope and the voltage multiplier present which is utilized to develop the kinescope ultor voltage. Thus in the beginning portion (upper half of the raster) of vertical scan, the high voltage will be somewhat lower than necessary. The electrons in the scanning beam will be sufficiently slow in passing through the deflection field caused by the deflection current to be deflected through a greater angle than desired thereby creating a widening of the raster, as is shown in FIG. 2.

During the latter portion of vertical scan, the opposite effect occurs. The high voltage has now increased due to the pincushion information. The electron beam velocity increases and is deflected to a lesser extend thereby narrowing the raster width toward the bottom of the raster as shown in FIG. 2.

To correct for this secondary undesirable raster modulation, an additional control signal representative of the high voltage is developed and employed in the manner described in conjunction with the description of FIGS. 3A and 3B which follows.

FIG. 3 is divided into two parts—FIG. 3A and FIG. 3B—which are on separate sheets due to the complexity of the circuitry contained therein. It is to be understood that terminal A on FIG. 3A is connected to terminal A on FIG. 3B; likewise, terminal B on FIG. 3A is coupled to terminal B on FIG. 3B.

FIG. 3A illustrates in block and schematic form a television receiver front end and the vertical deflection circuits, whereas

Figures 1, 2, 3A, 4:
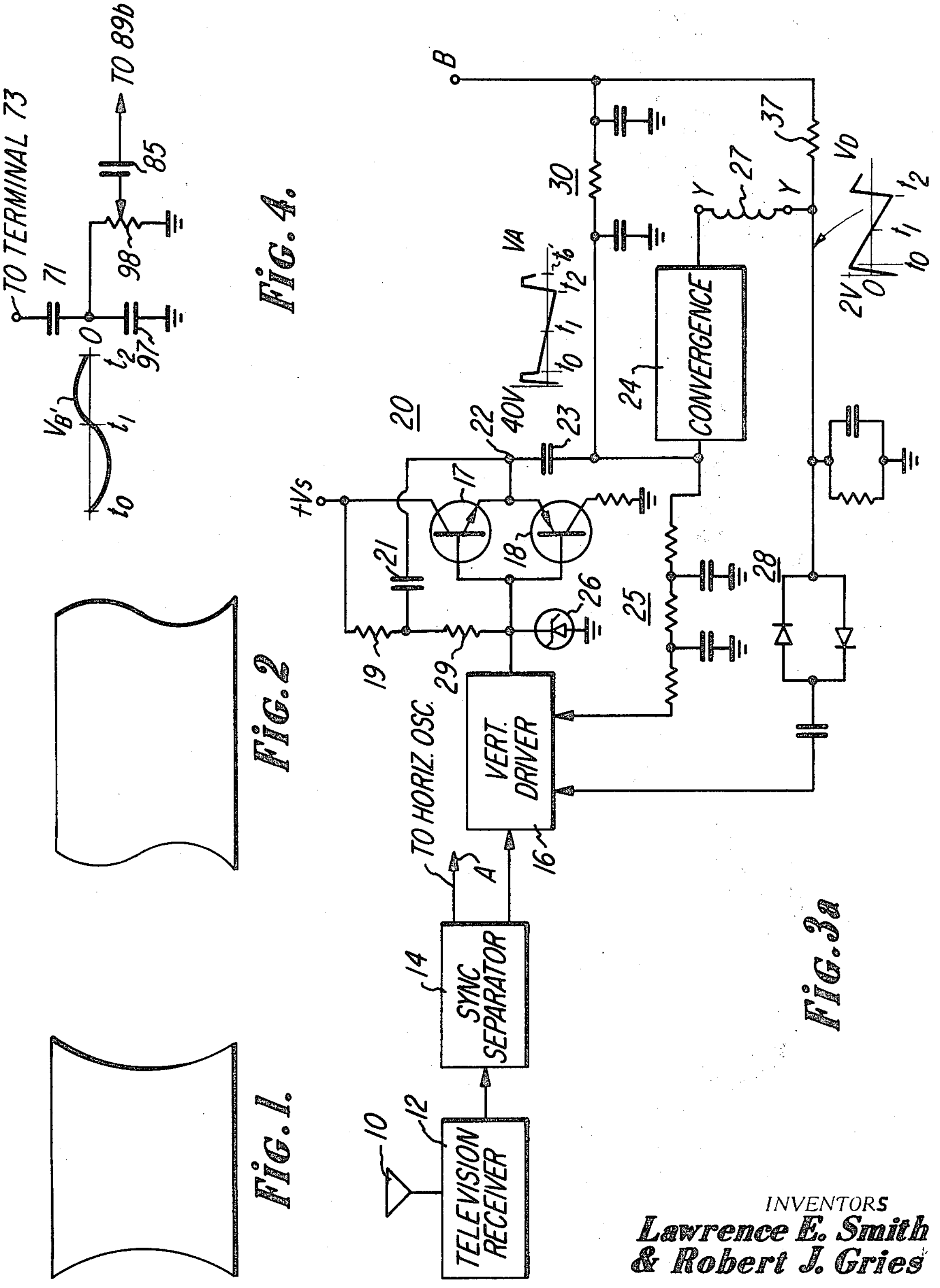

Referring to FIG. 3A in detail, an antenna 10 couples received television signals to a television receiver 12. The receiver 12 may be of the conventional type and includes, for example, a tuner for receiving selected television signals and a frequency converter for converting the received signals to a lower intermediate frequency signal. An I.F. amplifier amplifies the converted signals and couples them to a video detector circuit within receiver 12 from which luminance signals are developed and amplified by a video amplifier. The amplified video signals are then applied to a control element such as a cathode 34 on a kinescope 35 shown in FIG. 3B. The receiver 12 may also include a keyed automatic gain control circuit which controls the I.F. amplifier gain in accordance with conventional automatic gain principles. The video signals are also applied to a chrominance channel which processes color information to a form suitable for application to the kinescope 35. Kinescope 35 is of the type having three electron guns and a shadow mask (not shown) and serves as the color image reproducer for the illustrated receiver. An output signal from receiver 12 includes video and synchronization information which is applied to a synchronization separator stage 14. Separator 14 separates the synchronization information from the video information and the horizontal synchronization information from the vertical synchronization information. The horizontal sync pulses from sync separator 14 are coupled to the horizontal oscillator stage 40 in FIG. 3B by means of interconnecting terminals A—A. The vertical sync pulses from separator stage 14 are coupled to a vertical driver stage 16 which may include for example a high gain amplifier and switching means. The output of vertical driver stage 16 is coupled to a vertical deflection output stage 20. Vertical output stage 20 includes two output transistors 17 and 18 coupled in a complementary symmetry configuration. A supply voltage $+V_S$ provides the necessary operating power for the stage and resistors 19 and 29 and diode 26 provide the bias voltage for the bases of transistors 17 and 18. A bootstrap capacitor 21 couples the junction of resistors 19 and 29 to an output terminal 22 which is the junction of the emitters of transistors 17 and 18. A coupling capacitor 23 couples output signals appearing at junction 22 to a convergence circuit 24 and to the vertical driver stage 16 by means of an S-shaping feedback network 25 and to a waveshaping network 30. The output of the convergence stage 24 is coupled to the vertical yoke winding 27 associated with kinescope 35 by means of a terminal Y and to the vertical driver stage by means of an integrating network (not shown) to provide proper switching. The remote end of the vertical deflection winding 27 is coupled by means of a second terminal Y to a second feedback network 28 which is coupled to the vertical driver 16. The junction of vertical deflection winding 27 and feedback network 28 is coupled to terminal B by means of a resistance 37. The output of waveshaping network 30 is also coupled to terminal B.

The operation of the vertical output stage 20 is explained in greater detail in a co-pending application of Lawrence E. Smiths entitled "Transistorized Vertical Deflection Circuit," Ser. No. 37,668, concurrently filed. For the purpose of describing the operation of the present invention, it is necessary only to examine the information derived from the vertical deflection circuit 20 which is utilized to provide a recurring parabolic waveform at the vertical deflection rate. The desired parabolic waveform is obtained by matrixing the signals appearing at the input of waveshaping network 30 and the junction of the deflection winding 27 and feedback network 28. The waveforms at these two locations are shown adjacent to the circuit. The waveform $V_O$ shown at the bottom of the vertical deflection winding is of a generally sawtooth shape starting at the beginning of the vertical trace ($t_0$) crossing the zero axis at the center of trace $t_1$ and becoming increasingly negative until the end of trace ($t_2$) is reached. This waveform is shown having a peak amplitude of approximately 2 volts and accompanied by the symbol $V_D$. It would be possible to obtain a parabolic waveform by integrating this voltage, however, its amplitude is insufficient to provide the required parabolic waveform magnitude. Thus, it is necessary to matrix the output voltage at terminal B due to voltage $V_D$ with a second vertical rate signal. This signal, illustrated adjacent to waveshaping network 30 and accompanied by the symbol $V_A$, is a generally sawtooth waveform between the periods $t_0$ to $t_2$. Waveform $V_A$ includes between the period $t_2$ and $t_0$ the vertical retrace pulse. Signal $V_A$ is integrated by network 30 and combines with signal $V_D$ to provide at terminal B a parabolic waveform of the required magnitude and shape.

Figure 3B:
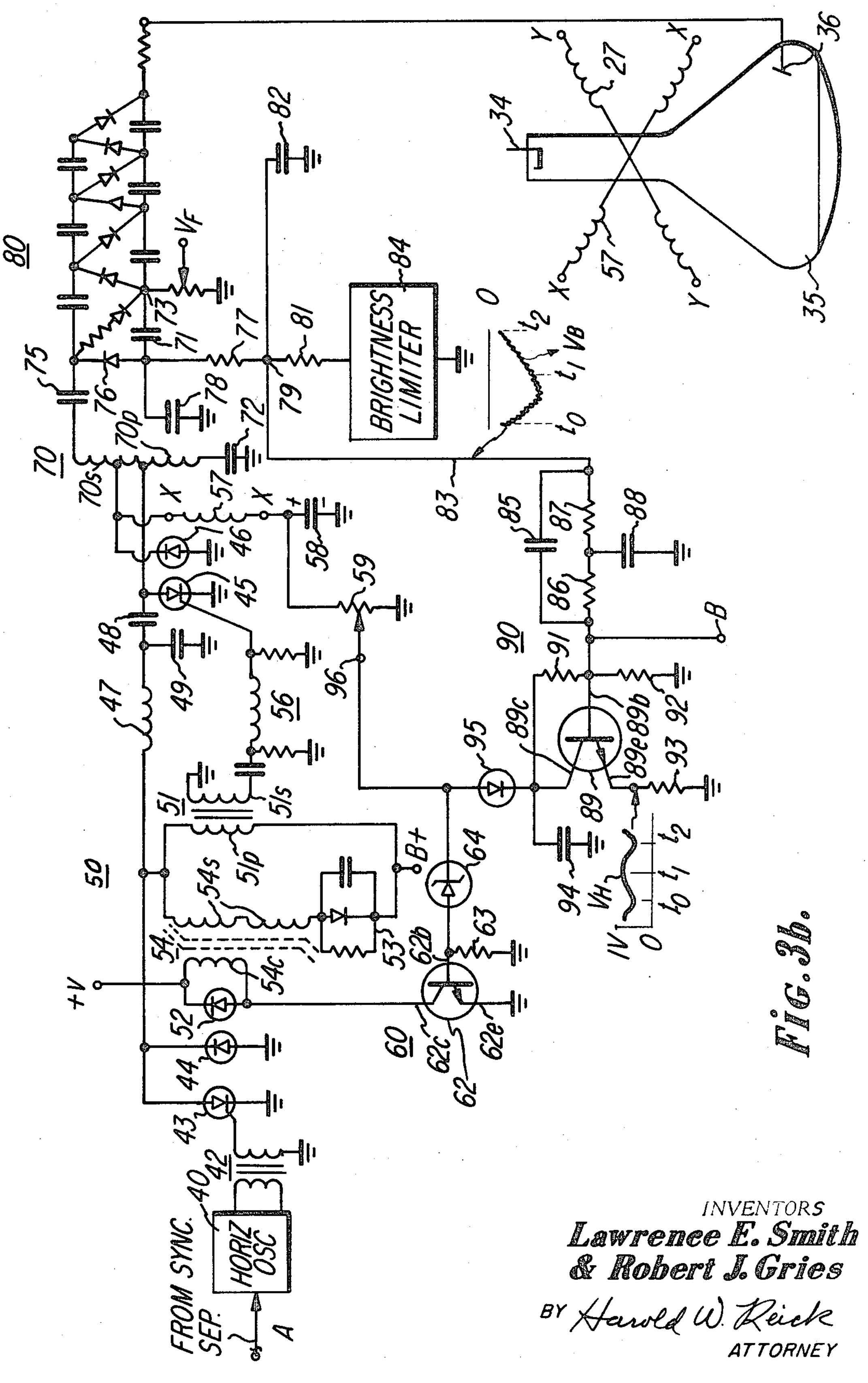
FIG. 3B illustrates in block and schematic form the horizontal deflection system, the high voltage generation system, the voltage regulator, and the pincushion correction circuitry of the present invention.

Referring now to FIG. 3B in detail, the incoming horizontal sync pulses at terminal A are applied to a horizontal oscillator 40 which produces horizontal frequency signals that are coupled to a horizontal output stage 50 by means of a coupling transformer 42. The horizontal output stage 50 is of the SCR type and includes a commutating SCR 43, a commutating diode 44, a trace SCR 45 and a damper diode 46. A commutating inductor 47 and a retrace capacitor 48 couple the commutating SCR and the trace SCR. An auxiliary capacitor 49 is coupled from the junction of inductor 47 and capacitor 48 to ground. Input power to the system is supplied by means of a B+ voltage supply which is coupled to the horizontal deflection system by means of an input inductor 51 and a parallely coupled secondary winding 54s of a saturable reactor 54. A network 53 including a resistor, a diode, and a capacitor is serially coupled as shown to winding 54s. A horizontal deflection winding (yoke) 57 associated with kinescope 35 is coupled to the damper diode 46 as shown. Its remote terminal is coupled to an S-shaping capacitor 58 which is returned to ground.

A horizontal output transformer 70 has a primary winding 70p coupled across the trace SCR 45. A direct voltage blocking capacitor 72 is serially coupled to the primary winding as shown. The secondary winding 70s of transformer 70 provides high voltage pulses to a voltage multiplier 80 during the horizontal retrace interval of each horizontal deflection cycle by means of a coupling capacitor 75. Multiplier 80 includes several diodes and capacitors coupled in a voltage quadrupler configuration. Its detailed operation is described in a co-pending application entitled "Ultor Voltage Supply," Ser. No. 830,026, filed on June 3, 1969. The ultor output voltage is coupled to the high voltage terminal 36 on kinescope 35. The multiplier also includes a lower focus voltage output shown in the diagram as an output terminal 73 accompanied by the symbol $V_F$.

The direct current input to the multiplier, which is representative of the kinescope beam current, is supplied by the direct current path including diode 76, resistor 77, resistor 81 and a brightness limiter circuit 84. Capacitors 78 and 82 bypass resistors 77 and 81 respectively.

A signal representative of the beam current which also bears a relationship to the ultor voltage is developed at terminal 79 by the direct current flowing through the aforementioned current path. This signal appears on conductor 83 which couples terminal 79 to the side pincushion circuit 90.

Circuit 90 includes a coupling capacitor 85 and a filter comprising resistors 86 and 87 having a capacitor 88 coupled from their junction to ground. Capacitor 85 couples the alternating frequency components of the signal present on the conductor 83 and which is illustrated by the waveform adjacent to conductor 83 labeled with the symbol $V_B$ to the base terminal 89b of pincushion control transistor 89.

Resistors 91 and 92 coupled from a collector terminal 89c of transistor 89 to ground, and having their junction coupled to base terminal 89b serve to bias transistor 89. An emitter resistor 93 couples emitter terminal 89e of transistor 89 to ground. The collector terminal 89c of transistor 89 is coupled by means of a unidirectional conductive device 95 to a terminal 96 which is the junction of an avalanche diode 64 and a wiper arm of a variable resistor 59. A capacitor 94 is also coupled from collector terminal 89c of transistor 89 to ground. A voltage regulator circuit 60 includes a transistor 62. Operating power for transistor 62 is supplied by a voltage supply +V which is coupled to a collector terminal 62c on transistor 62 by means of a control winding 54c on saturable reactor 54 which includes a diode 52 parallely coupled to the control winding. A base resistor 63 is coupled from base terminal 62b on transistor 62 to ground. Base terminal 62b is further coupled to terminal 96 by means of an avalanche diode 64.

The horizontal deflection stage 50 is described in detail in U.S. Pat. No. 3,452,244 assigned to the present assignee. A brief description is however included here. As the trace interval of each deflection cycle is initiated, the yoke current is conducted by means of damper diode 46 and is at a maximum negative value and increasing towards zero. As the mid-point of trace is reached, the charge on S-shaping capacitor 58 has reached a maximum and the yoke current conduction is about to transfer from diode 46 to trace SCR 45. At the mid-point of trace, which corresponds to the middle of the scanned raster, SCR 45 is triggered into conduction by means of a pulse from trigger circuit 56 which is supplied a signal by means of winding 51s on input reactor 51. Capacitor 58 now supplies energy to the yoke 57 during this latter portion of the trace interval.

During trace, capacitors 48 and 49 are charged from the B+ supply by the current path including parallel coupled inductors 51*p* and 54*s* and commutating inductor 47. The total inductance of the parallel inductors 51p and 54s determines the exact amount of charge present on capacitors 48 and 49 at the beginning of retrace. By varying this total inductance, the input energy to the system can be varied.

Voltage regulator 60 operates to vary the inductance of the secondary winding 54*s* of saturable reactor 54 in a manner described in detail in a co-pending application entitled "Voltage Regulator," Ser. No. 731,163 filed on May 22, 1968. Briefly described, voltage regulator 60 operates to maintain constant raster width with beam current changes and lines voltage (power supply) fluctuations in the following manner.

A voltage dividing potentiometer 59 is coupled across capacitor 58 and provides a reference voltage at its wiper arm terminal 96. This voltage is partially offset by the voltage across avalanche diode 64, the remaining voltage being applied to the base terminal 62*b* on regular transistor 62. The collector-to-emitter current path of transistor 62 includes the control winding 54*c* of saturable reactor 54. The voltage across capacitor 58 (which has a direct voltage component of approximately 50 volts in the polarity shown) varies due to changes in beam current or the B+ voltage, and the signal applied to the base terminal 62*b* due to this voltage change causes the collector current to vary in a manner which controls the inductance of the saturable reactor which will in turn change the input energy to the system in a manner to compensate for the B+ or beam current variations. The regulator does not, however, provide side pincushion correction. The required pincushion correction is supplied by pincushion circuit 90.

As described earlier, a parabolic waveform is developed by the vertical deflection and waveshaping circuits of FIG. 3A and is applied to base terminal 89*b* of control transistor 89 by means of interconnecting terminal B. By referring to FIG. 1, it is seen that at the top and bottom of the raster, little or no side pincushion correction is necessary while at the middle, a maximum amount is needed. The parabolic waveform present at terminal B will cause transistor 89 to conduct a maximum amount at the middle of the vertical scan and lesser amounts at the top and bottom. This conduction in turn will lower the voltage at terminal 96 in a parabolic fashion. (It is noted here that diode 95 and capacitor 94 are necessary to block current flow from the base terminal of transistor 89 through the base collector junction of this transistor during horizontal retrace when the voltage at terminal 96 is substantially reduced.) The parabolically varying voltage at terminal 96 during vertical scan will in turn, vary the collector current flowing in transistor 62. The control winding 54*c* of saturable reactor 54 senses this change in current in the control winding to cause the inductance of secondary winding 54*s* to vary in accordance with well known saturable reactor principles. The total inductance of the parallel circuit 54*s* and 51*p* therefore changes and the total input energy to the deflection system varies in response to the pincushion information at terminal B.

At the center of the raster where a maximum amount of pincushion correction is required, the signal at terminal B is at a positive maximum. Transistor 89 responds to this signal to be at its conductive peak which in turn minimizes the voltage at terminal 96. The collector current of transistor 62 will decrease due to the signal applied to its base from terminal 96. The control winding 54*c* will therefore have a diminished current which in turn tends to desaturate the core of the saturable reactor and increase the inductance of the secondary winding 54*s*. The total inductance of the parallel circuit 54*s* and 54*p* increases and the total input energy to the deflection system is increased. Thus, at the center of the raster, the horizontal deflection current will be increased a maximum amount by the pincushion correction circuit to correct for the pincushion distortion.

The parabolic waveform applied to transistor 89 provides more or less correction as needed at the various positions of the vertical scan interval. The waveform of the emitter voltage (and therefore the collector current of transistor 89) is illustrated by the waveform labeled $V_H$ which is adjacent resistor 93. Times $t_0$, $t_1$ and $t_2$ occur at the beginning, middle and end of the vertical scan interval respectively.

As noted earlier, the addition of this parabolic information alone will produce a secondary raster distortion of the type illustrated by FIG. 2. Thus an additional corrective signal is applied to the base 89*b* of control transistor 89. This additional corrective signal is representative of the high voltage variations due to the addition of the parabolic pincushion correction waveform. It has been found expedient to utilize the pre-existing terminal 79 on the direct current path for the high voltage multiplier 80. The signal present at this terminal is shown in detail in the waveform adjacent conductor 83 and accompanied by the symbol $V_B$. The high frequency components of waveform $V_B$ comprise video frequency information.

This additional correction waveform ($V_B$) which is coupled to the side pincushion control transistor 89 by means of capacitor 85 is utilized to control the input energy to the horizontal deflection output stage. The regulator circuit 60 responds to the additional signal $V_B$ in a similar manner as described in conjunction with the pincushion correction signal discussed. It is noted that to decrease the raster width at the top portion and widen the raster at the bottom, it is necessary to decrease and increase the input energy to the deflection system respectively. Thus, waveform $V_B$ shown adjacent to conductor 83 is more negative (the relative polarity necessary to decrease the input energy) during the interval $t_0$–$t_1$ which corresponds to the upper portion of the television raster than it is during the $t_1$–$t_2$ interval. While the decrease in input energy during the top half of the raster tends to degrade the high voltage; the change in deflection current is controlling and will change sufficiently to counteract any additional change in high voltage as well as decrease the raster to its desired dimensions. Likewise, during the lower portion of the raster, the increase in input energy tends to increase the high voltage which would tend to diminish the raster width, again however; the deflection current is increased in an amount sufficient to overcome the high voltage change, thereby expanding the raster width to its desired dimension.

The deflection current controls the raster width to a greater extent than the high voltage changes since the scan width is directly proportional to the yoke current and inversely proportional to the square root of the high voltage.

The direct current path from conductor 83 to transistor 89 includes resistors 86 and 87 with a bypass capacitor 88 from their junction to ground, and serves to aid regulator 60 in maintaining size constant with variations in beam current due to picture brightness changes.

Although the waveform $V_B$ in FIG. 3B is an adequate approximation of the required additional control signal, the circuitry of FIG. 4 provides a corrective signal $V_B'$ which is a high voltage sample and therefore provides more accurate correction when utilized as the additional corrective signal.

In FIG. 4, capacitor 71 (in the multiplier circuit 80 of FIG. 3B) has its terminal coupled to the junction of resistor 77 in FIG. 3B, disconnected and reconnected to an additional capacitor 97 to form a capacitive voltage divider from terminal 73 on the voltage multiplier 80 to ground. The voltage across capacitor 97 is additionally divided by a potentiometer 98 coupled across capacitor 97. The resulting voltage at the wiper arm of resistor 98 is coupled by means of capacitor 85 to the base 89*b* of side pincushion control transistor 89. When the circuitry of FIG. 4 is employed, capacitor 85 in FIG. 3B is removed and inserted as shown in FIG. 4. The voltage waveform appearing at the junction of capacitors 71 and 97 is illustrated in the figure and accompanied by the symbol $V_B'$. Voltage $V_B'$ is essentially a sample of the focus voltage which tracks the high voltage variations. It is seen that this signal is generally an S-shaped waveform and the polarity is such to correct for the S-shape raster distortion shown in FIG. 2.

Although the preferred embodiments of FIGS. 3 and 4 illustrate particular sample points for the high voltage correction signal, it is possible to obtain the desired waveform at other locations in the circuit, for example, at terminal 36 of kinescope 35 by using a voltage dividing network.

The following parameters have been utilized in the circuitry of FIGS. 3 and 4:

| | | | |
|---|---|---|---|
| Capacitor | 71 | 2,000 | picofarads |
| | 85 | .01 | microfarad |
| | 88 | .15 | microfarad |
| | 94 | 5.6 | microfarads |
| | 97 | .1 | microfarad |
| Resistor | 86 | 330 | kilohms |
| | 87 | 330 | kilohms |
| | 91 | 100 | kilohms |
| | 92 | 82 | kilohms |
| | 93 | 270 | ohms |
| | 98 | 1 | megohm |

What is claimed is:

1. In a deflection system of the type including a deflection output stage to develop a first deflection current for a deflection winding associated with a kinescope display device having a relatively wide deflection angle and for generating high voltage power for said kinescope, a raster correction circuit comprising:
   - a voltage regulator including control means for varying the input energy to said deflection system,
   - a source of second deflection current signals of a frequency equal to the field deflection rate utilized to display an image on said kinescope,
   - first coupling means for coupling signals from said source of second deflection signals to said control means of said voltage regulator to modulate the input energy to the said deflection system in a manner to compensate for side pincushion distortion in the raster;
   - a source of signals representative of the kinescope high voltage supply; and
   - second means coupling the alternating current components of said source of high voltage representative signals occurring at said field deflection rate to said first coupling means to apply high voltage variations at said field deflection rate to said control means of said voltage regulator for providing additional correction for side pincushion distortion in said raster.

2. A circuit as defined in claim 1 wherein said first coupling means includes means for integrating said signals from said source of second deflection signals to develop a parabolically varying side pincushion correction signal.

3. A circuit as defined in claim 2 wherein said first coupling means further includes a transistor having a control terminal and an output terminal, said side pincushion correction signals being applied to said control terminal and said output terminal being coupled to said voltage regulator circuit.

4. A circuit as defined in claim 3 wherein said signals representative of said high voltage variations at said field deflection rate are capacitively coupled to said control terminal of said transistor.

5. In a television receiver including a non-dissipative voltage regulator of the type in which the input energy to the horizontal deflection system is varied in response to variations in kinescope beam current and power supply voltage so as to maintain relatively constant scan width, a side pincushion correction circuit including:
   - a source of vertical deflection current,
   - control means coupled to said source of vertical deflection current, and to said voltage regulator circuit to vary the horizontal deflection current at a vertical deflection rate, thereby correcting for side pincushion distortion,
   - a kinescope high voltage supply, and
   - a source of signals representative of vertical deflection frequency variations in said kinescope high voltage supply, said source coupled to said control means thereby providing an additional raster correction signal.

6. In a television receiver including a non-dissipative voltage regulator of the type in which the input energy to the horizontal deflection system is varied in response to variations in kinescope beam current and power supply voltage so as to maintain relatively constant scan width, a side pincushion correction circuit including:
   - a source of vertical deflection current for providing side pincushion correction signals;
   - a kinescope high voltage supply;
   - a source of signals representative of vertical deflection frequency variations in said kinescope high voltage supply for providing an additional raster correction signal,
   - control means including a control transistor coupled to said voltage regulator circuit and to said source of vertical deflection current and to said source of signals representative of vertical deflection frequency variations in said kinescope high voltage supply, said control transistor having its collector current responsive to said side pincushion and said additional raster correction signal to vary the input signal applied to a control element of said voltage regulator.

7. A circuit as defined in claim 6 wherein said control means further includes an integrating circuit for developing a parabolically varying side pincushion correction signal in response to said vertical deflection waveform.

8. A circuit as defined in claim 6 wherein said source of signals representative of said vertical deflection frequency variations in said kinescope high voltage supply comprises:
   - a capacitive voltage divider coupled from a focus voltage supply associated with said kinescope to ground, and
   - means coupling a signal from a junction of capacitors in said voltage divider to a base terminal of said control transistor.

9. A circuit as defined in claim 6 wherein said source of signals representative of said vertical deflection frequency variations in said kinescope high voltage supply comprises:
   - a resistive current path having kinescope beam current flowing therein, said resistive path having a terminal at which is developed a voltage representative of beam current variations, and
   - capacitive means coupling said voltage to a base terminal of said control transistor.

10. In a television receiver employing a kinescope having a deflection angle greater than 90° and employing a side pincushion correction circuit of the type which couples vertical deflection rate parabolically varying signals to a voltage regulator which varies the input voltage to the horizontal deflection system, an improvement comprising:
    - a source of signals representative of vertical deflection rate variations in a kinescope high voltage supply, and
    - means coupling said signals to said voltage regulator to vary the input voltage to said horizontal deflection system in a manner to compensate for raster distortion caused by said vertical rate variations in said kinescope high voltage supply.

11. In a television receiver employing a kinescope having a 110° deflection angle and including a kinescope high voltage supply, and further including a non-dissipative voltage regulator coupled to a horizontal deflection output stage to maintain raster width relatively constant with power supply and beam current variations, a raster correction circuit comprising:
    - a source of vertical deflection rate signals having a generally sawtooth waveform, means for integrating said vertical sawtooth waveform to develop a parabolic waveshape side pincushion correction signal, a control transistor having base, collector and emitter terminals, said pincushion correction signals being applied to said base terminal, and said collector terminal being coupled to a control element of said voltage regulator whereby collector current variations in said control transistor causes said raster width to vary in a manner to compensate for side pincushion distortion, and a source of additional raster correction signals representative of vertical rate variations in said kinescope high voltage supply, said source coupled to said control element of said voltage regulator.

* * * * *